US010699580B1

(12) United States Patent
Gross

(10) Patent No.: US 10,699,580 B1
(45) Date of Patent: Jun. 30, 2020

(54) METHODS AND SYSTEMS FOR EMERGENCY HANDOFF OF AN AUTONOMOUS VEHICLE

(71) Applicant: Guident Ltd., London (GB)

(72) Inventor: Clifford M Gross, Miami, FL (US)

(73) Assignee: Guident Ltd. (GB)

( * ) Notice: Subject to any disclaimer, the term of this patent is extended or adjusted under 35 U.S.C. 154(b) by 0 days.

(21) Appl. No.: 16/386,530

(22) Filed: Apr. 17, 2019

(51) Int. Cl.
| | | |
|---|---|---|
| *G05D 1/00* | (2006.01) | |
| *G08G 1/00* | (2006.01) | |
| *G07C 5/00* | (2006.01) | |
| *G08G 1/01* | (2006.01) | |
| *H04W 4/90* | (2018.01) | |
| *H04W 4/40* | (2018.01) | |
| *G05D 1/02* | (2020.01) | |
| *B60W 10/04* | (2006.01) | |

(52) U.S. Cl.
CPC .......... *G08G 1/205* (2013.01); *G05D 1/0022* (2013.01); *G05D 1/0088* (2013.01); *G07C 5/008* (2013.01); *G08G 1/0112* (2013.01); *H04W 4/40* (2018.02); *H04W 4/90* (2018.02); *B60W 10/04* (2013.01); *G05D 1/021* (2013.01); *G05D 1/0287* (2013.01); *G05D 2201/0213* (2013.01)

(58) Field of Classification Search
CPC .... G05D 1/0088; G05D 1/021; G05D 1/0287; B60W 10/04
See application file for complete search history.

(56) References Cited

U.S. PATENT DOCUMENTS

| 8,874,301 | B1 | 10/2014 | Rao et al. |
| 9,120,484 | B1 | 9/2015 | Ferguson et al. |
| 9,429,943 | B2 | 8/2016 | Wilson et al. |
| 9,475,496 | B2 | 10/2016 | Allard et al. |
| | | (Continued) | |

FOREIGN PATENT DOCUMENTS

| EP | 3124348 A1 | 2/2017 |
| EP | 3401786 A2 | 11/2018 |
| | (Continued) | |

OTHER PUBLICATIONS

International Search Report and Written Opinion, PCT/IB2020/050548, dated Apr. 22, 2020.

*Primary Examiner* — Benyam Haile
(74) *Attorney, Agent, or Firm* — Ellenoff Grossman & Schole LLP; John C. Stellabotte

(57) ABSTRACT

An improved distributed information sharing system (DISS) and methods for an autonomous vehicle, the DISS programmed and configured to receive information from a plurality of distributed sensors; determine the existence of an incident, vehicles, passengers, pedestrians, animals and objects involved in the incident, a nature of the injuries and damages from the incident; determine if the autonomous vehicle can be safely moved autonomously from a location where the incident occurred to a second location; contact an emergency responder when the vehicle cannot be safely moved autonomously; receive a request to transfer control of the vehicle from an emergency responder user device; and in response, transfer control of the automated vehicle to a trusted emergency responder without requiring approval from an owner of the vehicle using encryption and handshake techniques; and notify an owner or interested party of the vehicle of the incident.

18 Claims, 5 Drawing Sheets

(56) References Cited

U.S. PATENT DOCUMENTS

| | | |
|---|---|---|
| 10,166,994 B1 | 1/2019 | Fields et al. |
| 2009/0105902 A1 | 4/2009 | Choi et al. |
| 2014/0052323 A1* | 2/2014 | Reichel .................. G07C 5/085 |
| | | 701/23 |
| 2017/0274906 A1* | 9/2017 | Hassan .................. B60K 28/14 |
| 2018/0102001 A1 | 4/2018 | Faust et al. |
| 2018/0354411 A1 | 12/2018 | Friedland et al. |
| 2019/0011931 A1 | 1/2019 | Selvam et al. |

FOREIGN PATENT DOCUMENTS

| | | |
|---|---|---|
| WO | 2015099679 A1 | 7/2015 |
| WO | 2018175808 A1 | 9/2018 |
| WO | 2018232032 A1 | 12/2018 |

\* cited by examiner

METHODS AND SYSTEMS FOR EMERGENCY HANDOFF OF AN AUTONOMOUS VEHICLE

FIELD OF THE INVENTION

The present invention is directed to methods and systems for operation of an autonomous vehicle. More specifically, the present invention is directed to methods and systems to handoff control of an autonomous vehicle to an emergency responder that is human or autonomous or a human vehicle occupant, in the event of an accident or other emergency situation.

BACKGROUND

Autonomous vehicles use various computer processing systems to control operation of a vehicle. Autonomous vehicles may require an initial input from an operator, such as a pilot, driver, or passenger to engage the autonomous operation system and then operate thereafter in modes with varying degrees of human input ranging from level 4 or 5 autonomous mode (where the vehicle essentially drives itself) to permitting a human operator to fully override the autonomous mode and have full manual control over the vehicle, and the full range of modes between the two extremes, with the potential for intermittent human input and control. Autonomous vehicles may include sensors, cameras, sonar, and radar to detect cars, pedestrians, and their respective proximities and characteristics. They may also rely on Global Positioning Systems (GPS) for navigation. The detection and identification of objects and information related to objects and navigation capabilities are critical to the safe operation of autonomous vehicles.

There have been methods and systems directed to autonomous vehicle operation. For example, U.S. Pat. No. 9,475,496 describes autonomous driving sensors that can be configured to monitor, among other things, road conditions, environmental conditions, occupants in the vehicle, and whether one of the occupants is a driver.

U.S. Pat. No. 9,120,484 describes an autonomous driving computer system that may use visual or audible cues to indicate whether it is obtaining valid data from one or more sensors, whether it is partially or completely controlling the direction or speed of the autonomous vehicle or both, such as whether there are any errors, etc. In addition, autonomous driving computer systems may also have external indicators which indicate whether, at the moment, a human or an automated system is in control of the vehicle, that are readable by humans, other computers, or both.

Methods and systems for autonomous vehicle operation also include collision avoidance systems that seek to avoid collisions, For example, U.S. Pat. No. 9,429,943 describes an artificial intelligence valet system that includes a collision avoidance system. If a collision cannot be avoided, then it is determined which object is best to collide with. After the collision, the collision avoidance system can initiate a call to emergency services and safely park the vehicle. In some implementations, the vehicle may be parked without emergency services being contacted if no injury has occurred.

Notwithstanding the substantial effort that goes into designing autonomous vehicles so that they can be operated safely, there will be instances where incidents, such as collisions, accidents, and other emergency conditions occur. Collisions, accidents, and other emergency conditions can result in additional problems when vehicles are operating autonomously.

Automated vehicle systems also include safe shut down and emergency response and accident reporting modes. For example, U.S. Pat. No. 8,874,301 describes a vehicle with autonomous driving control that has a set up mode, active drive mode, safe shutdown mode, and emergency response mode.

Such collision avoidance and accident reporting systems could be improved by making more precise assessments of the nature of the injuries and damage that has occurred following an incident, including more precise assessments of the number of vehicles, passengers, pedestrians, animals and objects involved and the nature of the injuries and damages to them.

There may be instances where an automated vehicle may not be able to be parked safely autonomously and emergency responders may be needed to be notified. For example, if an autonomously operated vehicle gets in an accident in busy intersection or highway, where other cars will be driving, the autonomously operated vehicle may need to be shut down to prevent additional damage or injury. The autonomous vehicle may also be needed to be moved out of the way autonomously or manually so that traffic can proceed and to ensure the safety of the autonomous vehicle passengers, other drivers, and pedestrians.

U.S. Pat. No. 9,475,496 describes methods and systems to override automated control of a vehicle. An override may automatically occur if, for instance, one of the occupants requires emergency services. During an emergency services override, the vehicle may be permitted to autonomously or non-autonomously travel to a police department, a fire department, a hospital, a refueling station, or the like. It also describes that in some instances, an emergency service provider, such as a 911 operator, may remotely override one or more driving restrictions that would otherwise prevent the vehicle from allowing one or more occupants to seek emergency services. An override may automatically occur if, for instance, one of the occupants requires emergency services. During an emergency services override, the vehicle may be permitted to autonomously or non-autonomously travel to a police department, a fire department, a hospital, a refueling station, or the like, but U.S. Pat. No. 9,475,496 does not specify how that override is implemented. It provides that an override may be transmitted to the owner's cell phone or email address, for instance, and may receive a response from the owner's cell phone or email address that either permits or rejects the override request. If permitted, the processing device may temporarily disable one or more of the driving restrictions. If the override request is rejected, the processing device may output a message to the occupant via, e.g., the user interface device indicating that the override request has been denied. The processing device may control the operation of the vehicle according to the driving restrictions associated with the selected profile. The owner may wish to grant the override request on a case-by-case basis as a reward or other incentive to the occupant.

It also describes override requests being transmitted to the owner's cell phone or email address, for instance and receiving a response from the owner's cell phone or email address that either permits or rejects the override request. But if the owner is not available, not available to respond quickly, or is incapacitated, it will be necessary to be able to transfer or hand off control of the automated vehicle to an emergency responder without receiving approval from the owner. Waiting to receive approval from the owner could result in injured persons not receiving timely attention and care. It also could create risk of further accidents and injuries, where a vehicle cannot be promptly moved out of the way of traffic.

What is need is needed are improved methods and systems for transferring control of an automated vehicle to a passenger or emergency responder, whether sentient or autonomous, in the event of an accident or emergency that can be used in conjunction automated vehicle artificial intelligence systems operating with collision or incident avoidance, and improved accident or emergency reporting.

SUMMARY OF THE INVENTION

As described in detail herein below, are improved, novel methods systems for transferring control of an automated vehicle to a passenger or emergency responder in the event of an accident or emergency that can be used in conjunction automated vehicle artificial intelligence systems operating with collision avoidance, and improved accident or emergency reporting.

In a first aspect, a distributed information system (DISS) is provided comprising: at least one processing device, the DISS programmed and configured to receive information from a plurality of distributed sensors in an autonomous vehicle; determine the existence of an incident based upon the information received from the plurality of distributed sensors; determine vehicles, passengers, and pedestrians, animals and objects involved in the incident and a nature of the injuries and damages to the vehicles, passengers, and pedestrians, animals and objects involved in the incident based on the information received from the sensors; determine if the autonomous vehicle can be safely moved autonomously from a location where the incident occurred to a second location; if the autonomous vehicle can safely be moved to the second location, autonomously move the vehicle to the second location and park the vehicle.

In another embodiment, the DISS is programmed and configured further to shut down the automated vehicle if the DISS determines that the autonomous vehicle cannot be moved safely from the location where the incident occurred to a second location.

In another embodiment, the DISS is programed and configured further to contact an emergency responder.

In another embodiment, the DISS is programed and configured further to provide the emergency responder with a number of vehicles, passengers, and pedestrians, animals and objects involved in the incident and the nature of the injuries and damages to the vehicles, passengers, and pedestrians, animals and objects involved in the incident.

In another embodiment, the DISS is programmed and configured further to determine when an emergency responder arrives at the automated vehicle based on information received from the plurality of distributed sensors.

In another embodiment, the DISS is programmed and configured further to receive a request to transfer control of the vehicle from an emergency responder user device; and in response to the request from the emergency responder user device, transfer control of the automated vehicle to the emergency responder without requiring approval from an owner of the vehicle.

In another embodiment, the DISS is programmed and configured further to require the request from the emergency responder to contain a unique identification number and be communicated from the emergency responder user device using encryption techniques.

In another embodiment, the unique identification number of the emergency responder is stored in the DISS as trusted.

In another embodiment, the DISS is programmed and configured further to require the request from the emergency provider user device to be communicated using a handshake with the DISS or permitting the owner to prevent the transfer.

In another embodiment, the DISS is programmed and configured further to communicate information related to the incident to an owner of the vehicle or other interested party.

In a second aspect, amethod for determining an incident involving an autonomous vehicle comprising receiving information from a plurality of distributed sensors at a distributed information system (DISS) in electronic communication with an autonomous vehicle; determining the existence of an incident based upon the information received from the plurality of distributed sensors; determining vehicles, passengers, and pedestrians, animals and objects involved in the incident and a nature of injuries and damages to the vehicles, passengers, and pedestrians, animals and objects involved in the incident based on the information received from the sensors; determining if the autonomous vehicle can be safely moved autonomously from a location where the incident occurred to a second location; if the autonomous vehicle can safely be moved to the second location autonomously, move the vehicle to the second location and park the vehicle.

In another embodiment, the method further comprises shutting down the automated vehicle if the DISS determines that the autonomous vehicle cannot be moved safely from the location where the incident occurred to a second location.

In another embodiment, the method further comprises the DISS contacting an emergency responder.

In another embodiment, the method further comprises providing the emergency responder with the number of vehicles, passengers, and pedestrians, animals and objects involved in the incident and the nature of the injuries and damages to the vehicles, passengers, and pedestrians, animals and objects involved in the incident.

In another embodiment, the method further comprises the DISS determining when an emergency responder arrives at the automated vehicle based on information received from the plurality of distributed sensors.

In another embodiment, the method further comprises receiving a request from an emergency responder user device to transfer control of the vehicle to the emergency responder user device; and in response to the request from the emergency responder user device, transfer control of the automated vehicle to the emergency responder without requiring approval from an owner of the vehicle.

In another embodiment, the request from the emergency responder is required to contain a unique identification number and be communicated from the emergency responder user device to the DISS using encryption techniques.

In another embodiment, the unique identification number of the emergency responder is stored in the DISS as trusted.

In another embodiment, the request from the emergency provider user device is communicated using a handshake with the DISS.

In another embodiment, the DISS communicates information related to the incident to an owner of the vehicle or other interested party.

DETAILED DESCRIPTION

Figure 1:
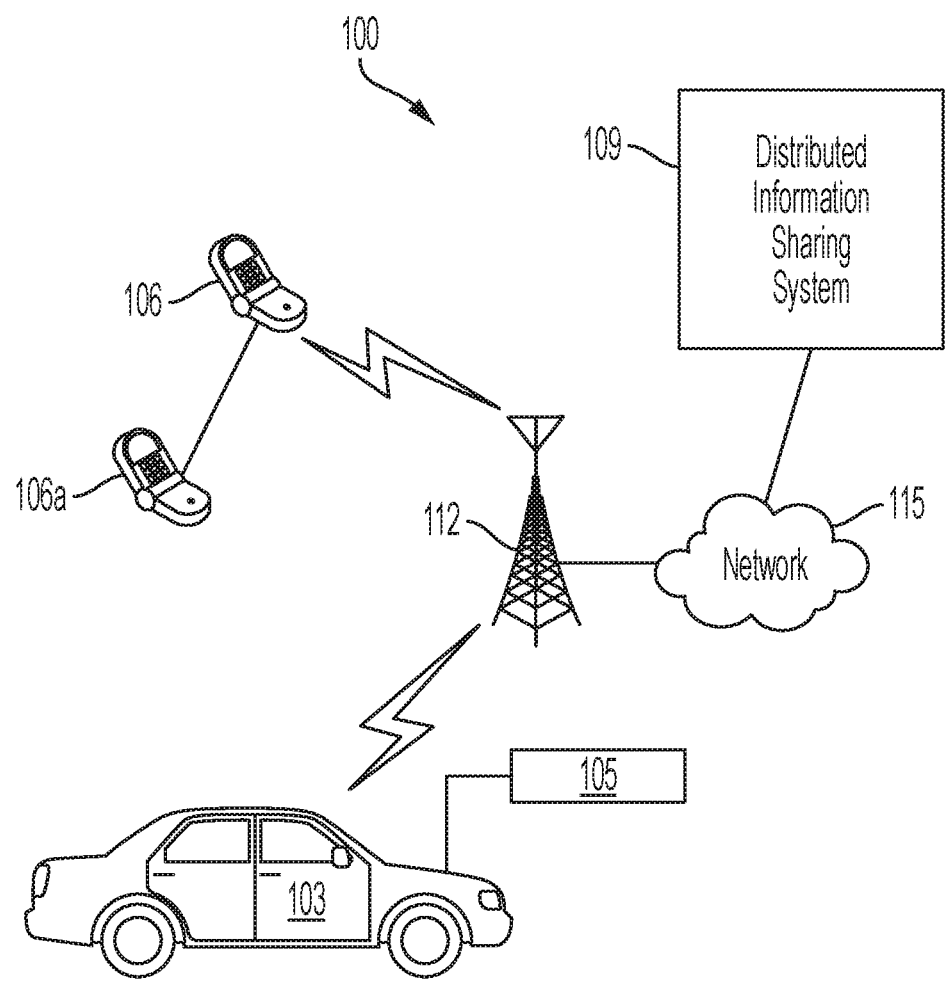
FIG. 1 is a graphical representation of various components of an artificial intelligence (AI) automated vehicle system to handoff control of an autonomous vehicle to an emergency responder or passenger in the event of an accident or other emergency situation in accordance with various embodiments of the present disclosure.

Disclosed herein are various embodiments related to artificial intelligence systems and methods. Reference will now be made in detail to the description of the embodiments as illustrated in the drawings, wherein like reference numbers indicate like parts throughout the several views.

Automated cognitive and control techniques can be used to relieve drivers from the mundane moment-to-moment decision making involved in driving. In the case of autonomous vehicles, features such as automated pick-up and drop-off services and pedestrian detection and avoidance offer convenience and safety to the user of the vehicle. An AI system for an autonomous vehicle can include current mobile technology, fuzzy logic and neural networks that enable the vehicle to navigate to its user. While an autonomous vehicle is operating under AI control, the AI system can recognize when a collision with an object such as, e.g., a human, an animal, another car, object, or any combination thereof is inevitable due to unforeseen situations. In response to such a determination, evasive actions can be initiated to intelligently avoid the collision or, in the worst case scenario, decide which object to collide with if faced with an inevitable collision. This system can be implemented as a "plug in and play" item from off the shelf or via a retrofit sale process or it can be built into a new or existing vehicle. This system can be extended to not only park a vehicle but it can also be used by the user to navigate to a destination whether or not the user is aboard the vehicle and the vehicle will be able to do so with no help from the user. For certain vehicles there may not be any passengers or drivers, as they may be limited to package delivery and other utilitarian services.

Additionally, autonomous vehicles can use GPS technology to map routes. The AI system can enable the vehicle to gradually learn driving patterns of the user. The AI system continually learns the driving behaviors of its user, using artificially intelligence techniques, so that when the vehicle operates autonomously it can mimic driving patterns of the user such as, e.g., preferred speeds, closeness to the curb, closeness to the center painted line, avoidance of potholes or other obstacles, and/or regularly traveled route. In addition, a context-aware web service may be employed to allow drivers to communicate commands and relay information to the vehicle to improve the performance of their vehicle. The information may also be used by other vehicles and users of the AI system. Any vehicle utilizing the AI system can relay information about the roads they are traversing to aid in path planning.

Referring to FIG. 1, shown is a graphical representation of various elements included in the AI system. For example, the AI system 100 can include a vehicle 103, a user device 106, an emergency responder user device 106a, and a distributed information sharing system (DISS) 109, which include processing circuitry for implementing various features of the AI system. In various embodiments, the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. In yet other embodiments, the processing circuitry may include one or more software modules executable within one or more processing circuits. The processing circuitry may further include memory configured to store instructions and/or code that causes the processing circuitry to execute data communication functions.

The vehicle 103 and user devices 106 and 106a can communicate via a wireless network 112 such as, e.g., a wireless local area network (WLAN) and/or cellular network. The vehicle 103 can include processing circuitry (e.g., a transmitter, receiver, and/or transceiver) to support the wireless communications. User devices 106 and 106a can include mobile processing systems such as, e.g., cellular telephones, tablet computers, e-readers, mp3 players, and portable media players such as, e.g., iPod touches, and iPads. For example, the vehicle 103 and/or user devices 106 and 106a may support cellular communications such as, e.g., a cellular data connection such as third-generation (3G), fourth-generation (4G), fifth generation (5G), long term evolution (LTE), or other data communication standard. The vehicle 103 and/or user device 106 may support wireless communications such as, e.g., IEEE 802.11a/b/g/n (Wi-Fi). Processing circuitry of the vehicle 103 and user devices 106 and 106a can also support GPS capabilities to determine their geographical location. The AI system 100 can use applications that are independent of the user device platform or operating system (e.g., Android, iOS, webOS, Blackberry, Symbian, etc.) and/or the vehicle type, make, model, and manufacturer. Communication with the DISS 109 can be carried out via a network 115 (e.g., the Internet) that is communicatively coupled to the wireless network 112. The DISS 109 may be implemented as, e.g., a web service on a processing system such as one or more servers.

The DISS 109 and AI system 100 can provide various features such as, e.g., autonomous passenger retrieval, autonomous parking, intelligent incident avoidance, intelligent incident reporting, gradual intelligent route learning, remote cabin control, and/or distributed information sharing. Autonomous passenger retrieval can allow the vehicle 103 to independently retrieve its user. An application interface (or app) operating on the user devices 106 and 106a may be used to request the vehicle 103 to collect the user at a specified location. The vehicle 103 may directly map routes and navigate without human intervention as well as travel according to user specifications such as, e.g., using previously recorded routes. In some embodiments, the vehicle 103 may include processing circuitry that can support the operation of the application interface. The DISS 109 can support the recording and storage of routes as well as routing evaluation and recommendations. Autonomous parking can allow the vehicle 103 to park itself after dropping off its user without further user input or control. The vehicle 103 may search out parking spots in the surrounding area as well as park in previously recorded parking areas or locations. The DISS 109 can support the recording and storage of parking areas. When used together, a vehicle 103 may be autonomously parked and retrieved by a user through the user devices 106 and in an emergency, emergency responder user device 106*a*.

Intelligent incident avoidance can identify objects that are potentially in the path of the vehicle 103, thereby allowing the vehicle 103 to minimize potential injury and/or damage. Intelligent incident reporting can keep a user informed through the user devices 106 and 106*a* of when a vehicle 103 is, e.g., touched, broken into, and/or hit by another vehicle. The user may define a level of vehicle interaction in the DISS 109 to determine when the user wants to be informed about incidents. When an incident is detected, vehicle cameras may take pictures of the vehicle 103 and its surroundings and/or record audio and/or video around the time of detection. Gradual intelligent route learning can allow for driving patterns of the user to be learned and used by the vehicle 103 during autonomous operation.

Remote cabin control can allow the user to control settings and/or determine conditions of the vehicle 103 from the user devices 106 and 106*a*. For example, the user may be able to remotely operate windows, sun/moon roof, doors, trunk, side door mirrors, lights (e.g., cabin lights, exterior head lights, etc.), seat position and/or temperature, interior climate controls (e.g., air conditioning, heat, defogger and/or other model specific settings such as humidity), media devices (e.g., standard and/or XM radio, compact disc player, DVD player), and/or remotely start the vehicle 103. Control and/or status information may be communicated directly between the vehicle 103 and user device 106 and 106*a* via the wireless network 115 and/or through the DISS 109, which may store predefined control settings for the vehicle 103. The application interface may also allow the user devices 106 and 106*a* to retrieve diagnostic information from the vehicle 103 for use by the user.

Distributed information sharing allows the AI system 100 to use information shared by users of the system to improve recommendations for parking or routing of other vehicles, as well as other features of the AI system 100. Shared information can include, but is not limited to, routes used by autonomous vehicles (including GPS route corrections), parking area locations, area parking patterns, reported instances of crime and/or vandalism, etc. Users of the AI system 100 may use user devices 106 and in an emergency, an emergency provider may use emergency responder user device 106*a* to share area information by submitting the information to the DISS 109, which may then meld the shared information with information from standard map navigation sources and intelligent transportation systems to assist all users of the AI system 100. The DISS 109 can facilitate sharing of information between a vehicle 103 and user devices 106 and 106*a*, as well as sharing the information with other users of the AI system 100. For example, the shared information may allow a vehicle 103 to autonomously travel to a user or to parking spots more efficiently. Shared information may also allow an autonomous vehicle 103 to effectively operate within areas that were not previously visited by the user. Routing and/or parking suggestions may also be provided to assist a user who is manually operating the vehicle 103.

A user interacts with the AI system 100 through an application interface (or app) executed on user devices 106 and in an emergency, emergency responder user device 106*a* of FIG. 1. The DISS 109 (FIG. 1) melds information from standard map navigation sources with shared user generated information. Information is shared by users of the AI system 100 by sending information to a centralized repository of the DISS 109 using the application interface on user devices 106 and 106*a*. The geolocation and networking capabilities of current mobile devices can be used to provide real-time information to the DISS 109. The AI system 100 can then use the user information to determine locations that may be most likely to have parking spaces available at a certain time based on success rate data shared by users of the AI system 100. The AI system 100 is context aware, meaning it is aware of various factors related to its operation, and able to act upon that awareness. For example, the AI system 100 may be aware of the GPS positioning of the user, the position of the user's destination, and the time, date, and day of the week in which shared locations have been used. When a user or an autonomous vehicle utilizes shared information from DISS 109 for navigating, the resulting usage data corresponding to that information is captured and saved by the DISS 109. For instance, the captured data can include whether or not open parking spaces were found at shared locations or how long it took to traverse a certain route, as well as the day and time when those usage instances occurred. All that contextual information can be used by the AI system 100 to determine which location will be most likely to have free parking.

Requests, feedback, and information submitted by a user devices 106 and 106*a* are relayed to the DISS 109. The DISS 109 can use a datastore to store and/or retrieve parking and route data shared by users of the AI system 100, as well as data on the context of the usage of that data. In order for the AI system 100 to meld user submitted information with existing navigation information, the DISS 109 can use the coordinates of parking areas obtained from the data and a combination of user shared routes and routes from one or more map navigation source(s) to determine routing and/or parking information. Context information accumulated when a user navigates with the aid of the AI system 100 may be used to determine which data to provide when the user makes an information request. When a user initiates a request from the user devices 106 and 106*a*, the application interface can retrieve origin and destination information, as well as the time and date of the request. That information is sent to the DISS 109, which can use the request information to determine the appropriate response to the request. Operation of the various components of the AI system 100 may be understood by examples of functions offered by the system.

The functionality of the AI system 100 is possible because the DISS 109 is context aware. Context awareness is the capability of the AI system 100 to be aware of its physical environment or situation and respond proactively and intelligently based on that awareness. The DISS 109 can be aware of the GPS positioning of the vehicle 103, and when the vehicle 103 enters an area that has previously been learned, that area's contextual information will be relayed to the processing circuitry or computer inside the vehicle 103 during autonomous driving and to the user during manual driving. When routes are shared, the DISS 109 will also record the time taken driving the route as well as the time when the route was driven, not only when the route is initially recorded, but also during every subsequent time that custom route is driven. Using that semantic data, the AI system 100 will be able to choose a preferred route during autonomous driving and prioritize suggested routes to give users during manual driving. Similarly, data shared about parking times, pricing, and availability will be used by the system to choose a preferred areas to park during autonomous driving and prioritize suggested parking areas to tell users about during manual driving.

The use of shared navigation data makes it possible for erroneous data to be shared either through human error or malicious users. DISS 109 may mitigate that possible problem by storing the ID of users who share a location. In the event that a user is given erroneous information, the user may report that fact via the application interface on the user devices 106 and in an emergency, device106a. In order to account for the possibility of users incorrectly marking data as erroneous, DISS 109 may operate according to a "3 strikes and out" policy. If a piece of submitted navigation information is marked as erroneous 3 times, that data is removed from the datastore. In addition, the user who uploaded that erroneous data may be given their first strike. If a user has been flagged for sharing erroneous data for a predefined number of times (e.g., three), that user may be restricted from sharing information with the DISS 109.

The AI system 100 also supports an intelligent incident avoidance system (iCAS). An incident can include a collision or other disruption or damage to the vehicle 103. The incident avoidance system is a vehicle-independent system that is used to intelligently determine the difference between humans, animals, and other objects that may be in or that may enter into the path of the vehicle 103. When an incident cannot be avoided, the system determines what is the "best" to collide with after determining the classification of the living object. The system resolves which collision minimizes, in the order of precedence, the loss of human life, then the loss of animal life, and next damage to the environment.

The collision avoidance system makes use of sensory data from sensors 105, including cameras, ultrasonic sensors, line following sensors, and thermal sensors to achieve its goals. Other sensors that may be used include, but are not limited to, laser range finders and other distance sensors, Lidar, stereo cameras, audio sensors, gyrometer, infrared sensors, photosensitive sensors, GPS units and tracking systems, etc. After collecting data from the sensors, the collision avoidance system employs artificial intelligence techniques such as fuzzy logic, neural network, and/or convolutional neural networks to determine the difference between human and animals, and then to determine which one to impact or avoid. The collision avoidance system can be implemented by processing circuitry of the vehicle 103 (e.g., computer systems, super computers, microcontrollers and/or external memory).

Photosensitive sensors may be used primarily for lane detection while thermal sensors can be used to give thermal readings for objects in the vehicle's path including for example pedestrians, animals, ice and standing water. The collision avoidance system may also use ultrasonic sensors, cameras and laser range finders, in their ability to ascertain distance information, for object avoidance. The incident avoidance system is dependent on the vehicle's ability to properly detect objects, road signs, traffic lights and other bodies. As a result, an independent vision system can used. Data from the vision system may be used to collect stereovision quality picture data that can be fed to processing circuitry such as, e.g., a microcontroller for processing. The vision system contains, but is not limited to, stereo cameras, microcontrollers and connective components. Positional data to keep track of the vehicle 103 and the user at various locations is also gathered. GPS units in the vehicle 103 and user devices 106 and in an emergency, device 106a may be used to retrieve positional data. In some implementations, radio frequency identification (RFID) readers and RFID tags may be used to increase the accuracy of the positional data that will be received from the GPS unit.

Neural networks have been successfully employed in autonomous vehicle navigation. Neural networks utilize computational methods that have been derived to mimic the brain through the use of highly interconnected, processing elements which give them learning capabilities and enable them to recognize and understand, subtle or complex patterns. A neural network is a mathematical model that resembles a biological network in structure and functionality. It is an adaptive system that allows the network to change its structure based on data transmitted through it during its learning phase. After the network learns during the learning phase, it can then be used to predict future outcomes when fed with relevant data.

Neural networks can be employed by the incident avoidance system to identify human objects based upon, e.g., their different shapes, different body structures, different postures, different poses, different light intensities, different ethnicity, different activities, different movement and/or velocities in the area of the vehicle, and/or different locations in the road. Non-human living objects such as animals may be identified based upon, e.g., their different shapes, different body structures, different colors, different activities, and/or different movement and/or velocities in the area of the vehicle. Combinations of humans and animals may also be identified based upon, e.g., their different shapes, different body structures, different colors, different activities, and/or different movement and/or velocities in the area of the vehicle. Based on the neural network learning the above properties of both animate and inanimate objects in the vicinity of the vehicle, the incident avoidance system can tailor a response to the identification.

Fuzzy logic can also be employed in vehicle control. Fuzzy logic is an artificial intelligence technique that recognizes that a statement is not only evaluated to be true or false but can also be varying degrees of both values. Fuzzy logic can take the vehicle automation a step further by including certain aspects of human intelligence into the design. Fuzzy logic and fuzzy theory can provide a set of rules that may be used to decide which living object classification the object falls into. In addition to classifying objects, fuzzy logic and fuzzy theory may be used, in the event that the information is not complete, to make a decision about which object, if any, should be collided with.

The combination of neural networks and fuzzy logic provides the incident avoidance system with the ability to identify and/or distinguish between human objects, irrespective of human shape or activity, and non-human living objects like animals with a high level of detection accuracy. Based on the living object classification, a determination can made about which object should be collided with to minimize, firstly, the amount of human loss, secondly the animal life loss and thirdly, environmental damage. In cases where sensory data is incomplete or partial due to limitations of the environment or sensors, fuzzy logic and fuzzy theory techniques can be employed to make the final decision as to whether an impact should be made and with which object.

The AI system 100 also supports a gradual intelligent route learning (GIRL) to allow the AI system 100 to learn driving patterns and/or preferences of the user. For instance, gradual intelligent route learning may learn that the user prefers routes with less stop signs, traffic lights or even pedestrians. It may also realize that the user prefers to drive through particular areas while going to work and go along other routes when returning from work. Frequently travelled paths are learned by the system. This enables the vehicle 103 to be perceptive to the roads the user prefers to use even if it does not take the user on the shortest path to the destination or in the shortest time to the destination. Other driving characteristics of the user may also be learned such as, e.g., how the user accelerates and decelerates, the side of the road preferred when driving in different areas (e.g., if it is a multiple lane highway or a one lane highway), the distance the vehicle is from either edge of the lane, how the user avoided pot holes in the road, the distance between the vehicle and other vehicles around it, speed preferences during different segments of road, and during which times of the day does the user prefer to drive certain routes in comparison to other routes.

The user may configure the gradual intelligent route learning to determine how often a path must be travelled to have the route's driving preferences learned by the AI system 100. For example, a default setting may be three times per week to trigger the gradual intelligent route learning to remember driving preferences for that route. Processing circuitry within the vehicle 103 stores travel information and learned user preferences. For instance, the vehicle activity may be tracked using, e.g., GPS tracking, camera imaging, laser range finding, and/or Lidar information over a defined time period (e.g., a week). The activity information may be stored in memory by the processing circuitry (e.g., a computer) and evaluated by the gradual intelligent route learning to determine if a route and/or driving preferences are to be learned. The learned routes and preferences may be sent to the DISS 109 for storage and use when the DISS 109 determines recommendations for the user. These routes and preferences may also be used by the vehicle 103 for autonomous operation.

Vehicle 103 also includes manual controls to enable manual operation of vehicle 103 in the event, for example, autonomous operation is disabled or unsafe, following an incident, such as an accident.

Figure 2:
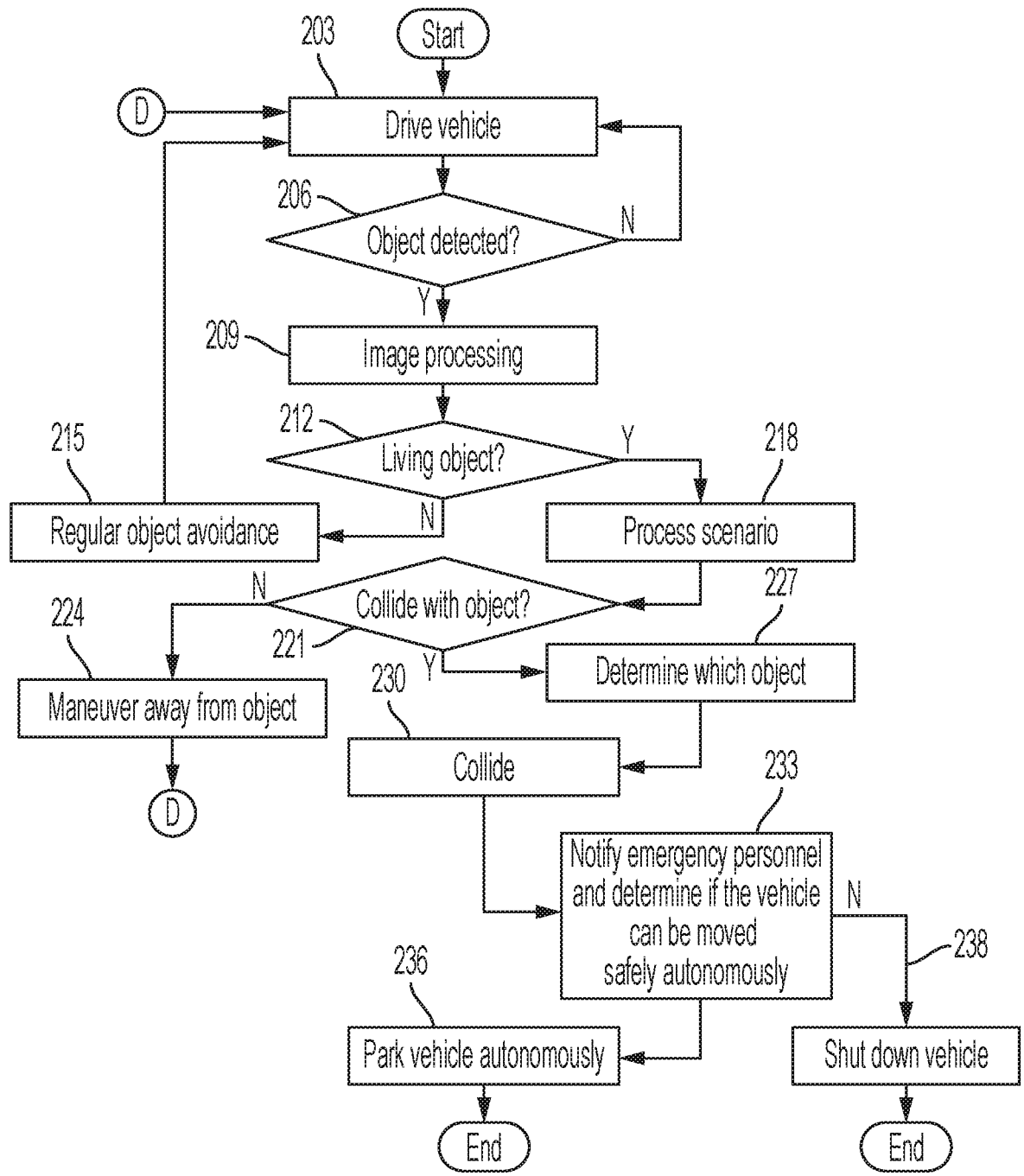
FIG. 2 is a flowchart illustrating an example of an incident avoidance system that can be implemented in a vehicle of the system of FIG. 1 in accordance with various embodiments of the present disclosure.

Referring to FIG. 2, shown is a flowchart illustrating an example of the incident avoidance system that can be implemented in a vehicle 103 with the DISS 109 of vehicle 103 in the AI system 100 (FIG. 1). Beginning with 203, the incident avoidance system is active while the vehicle is autonomously driving. Processing circuitry of the vehicle 103 monitors sensors installed in the vehicle 103 to determine whether an object is detected in 206. If an object is detected in the path of the vehicle 103 or may enter the path of the vehicle 103, a vision system processes one or more images in 209 to determine if it is a living object. If the detected object is not a living object in 212, then the vehicle 103 can operate with available object avoidance algorithms in 215 before continuing operation in 203.

If it is determined in 212 that a living object has been detected, then the incident avoidance system processes the scenario to determine if the vehicle 103 should collide with the object. If it is determined in 221 that a collision can be avoided, then in 224 the vehicle 103 maneuvers away from the object before returning to 203. If a collision cannot be avoided in 212, then it is determined in 227 which object is best to collide with in 230. After the collision, the incident avoidance system can initiate a call to emergency services in 233 and determining if the vehicle 103 can be safely moved autonomously from a location where the incident occurred to a second location autonomously and safely park the vehicle 103 in 236. In some implementations, the vehicle 103 may be parked in 236 without emergency services being contacted in 233 if no injury has occurred. If the vehicle cannot be safely parked in 238, the vehicle can be shut down until emergency personnel arrive or the vehicle 103 can be safely moved manually by a driver, passenger, or by an emergency responder using emergency responder user device 106a and the methods and systems for handing off automated control of the vehicle 103 described in FIG. 4.

The AI system 100 also supports an intelligent incident reporting system (iARS). The accident reporting system detects if, while the vehicle is parked or idling or even in motion, an external entity tampered with the body or other portion of the vehicle 103 causing damage to the vehicle 103 (FIG. 1). Using audio and visual sensors, accident reporting system can record parties involved with the contact and an incident report may be sent to the user or owner informing him or her of possible damage to the vehicle. It also can provide assessments of the number of vehicles, passengers, and pedestrians, animals and objects involved and the nature of the injuries and damages to them.

Sensors of the accident reporting system may remain in a hibernation state until an incident or activity is detected, at which time the sensors are fully turned on. Activities that can activate the accident reporting system include, but are not limited to, other vehicles hitting the vehicle 103, humans and/or animals touching and/or damaging the vehicle 103, vandalism to the vehicle 103, theft of the vehicle 103, and/or foreign objects falling on the vehicle 103. Sensors can include, cameras (mono and/or stereo), laser range finders, Lidar, gyrometer, infrared sensors, thermal sensors, etc. Processing circuitry (e.g., a computer or other processing device) in the vehicle 103 may control and monitor the sensors.

When an incident is detected, data is collected from the sensors and the accident reporting system determines what type of activity is happening around the car by assessing the data. The incident reporting system informs the user of the type of activity (e.g., when vehicle is touched, being broken into and/or hit by another car) through the application interface on the user device 106. The user may then view data from the vision, sound and thermal sensors to determine whether to call the authorities, press the panic button for the vehicle 103, or do nothing or any combination of those responses. The accident reporting system may be configured to automatically contact authorities about the incident when approved by the user. It also can determine. The user can define which activities they want to be informed about. For instance, a user can configure the accident reporting system to report burglary attempts, foreign object interference with the vehicle, if another car hits the vehicle, or any combination thereof.

When an incident is detected, the vision system of the vehicle 103 takes pictures and/or video recordings of surroundings and the audio system records sounds made around the time of detection or interference. The data collected from detection of the incident can be recorded analyzed and used to generate an incident report. This report is sent to the user via the user device 106. The incident report can contain screen shots and/or video of the incident with probable perpetrators along with any audio that was recorded using an installed microphone during the incident. The incident report also can be sent to an emergency responder user device 106a.

Figure 3:
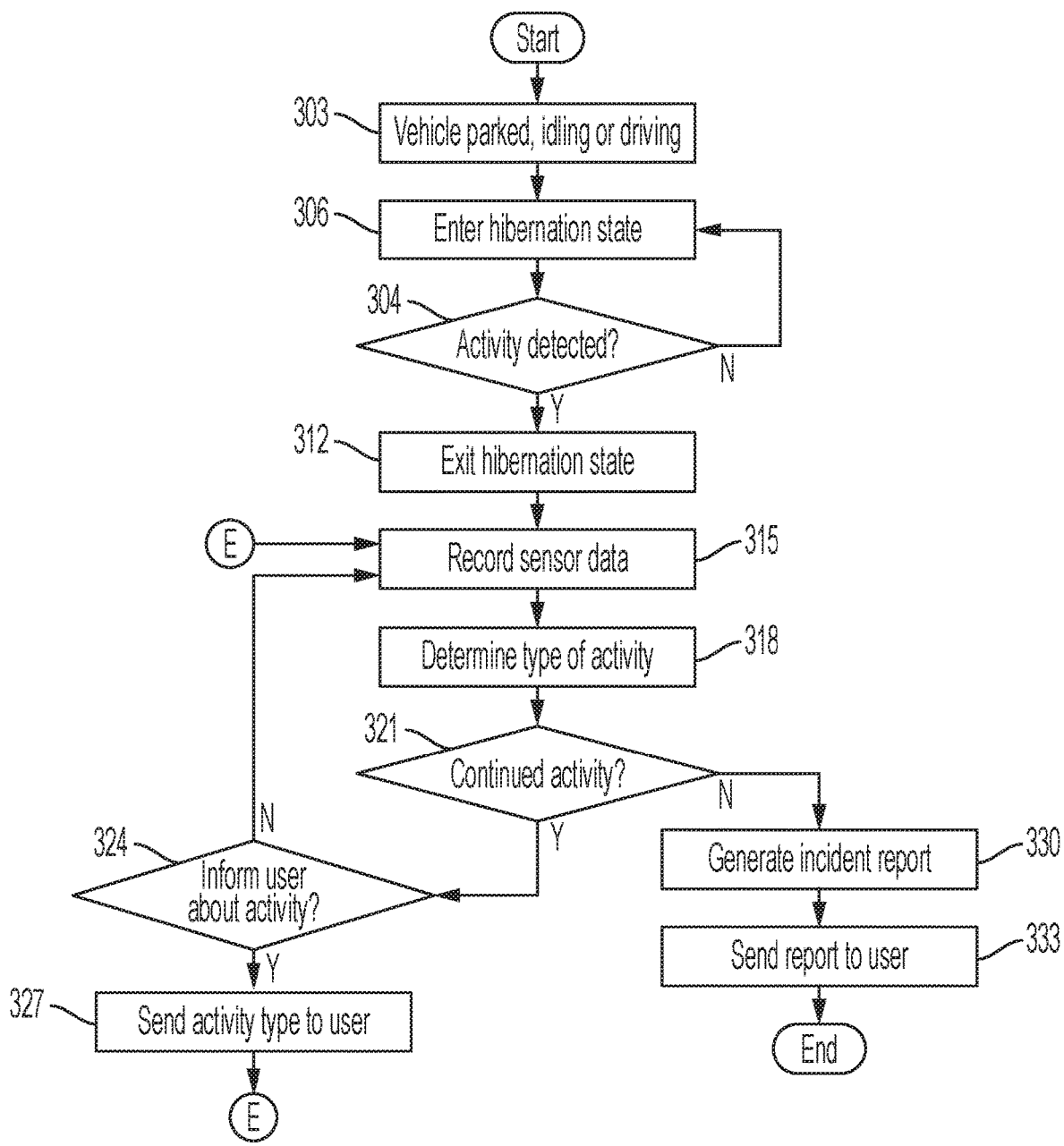
FIG. 3 is a flowchart illustrating an example of an incident reporting system that can be implemented in a vehicle of the AI system of FIG. 1 in accordance with various embodiments of the present disclosure.

Referring to FIG. 3, shown is a flowchart illustrating an example of the accident reporting system that can be implemented in a vehicle 103 with DISS 109 of the AI system 100 (FIG. 1). Beginning with 303, the incident avoidance system is active while the vehicle is in a parked position, stationary, driving or idling. In 306, the accident reporting system enters a hibernation state or mode to reduce power consumption of the sensors. If an activity or incident is detected in 309, then the accident reporting system exits the hibernation state in 312 and the sensors are fully powered up. For example, the incident avoidance system may detect movement of the vehicle 103 or an impulse caused by an impact with the vehicle 103. The incident reporting system then begins recording the sensor data in 315. The sensor data may be recorded for a predefined interval such as, e.g., one minute.

The type of activity is determined by the accident reporting system in 318 based upon the recorded data and other indications from the vehicle systems. For example, the video images may be used to identify whether the accident is cause by an individual, animal, another vehicle, or other object. Characteristics of the movement and/or impact may also be used to determine the type of accident. If the activity continues in 321, then accident reporting system determines if the user wants to be informed about the identified activity type in 324 by viewing the user's predefined preferences. If so, then the reporting system notifies the user of the activity type by sending a notification to the user device 306. The accident reporting system continues recording the sensor data in 315. If the activity has stopped in 321, an incident report is generated in 330, which is sent to the user via the user device 106 in 333 or via email or a privately accessed web application. The format of the incident report may be predefined by the user and may include at least a portion of the recorded sensor data.

Figure 4:
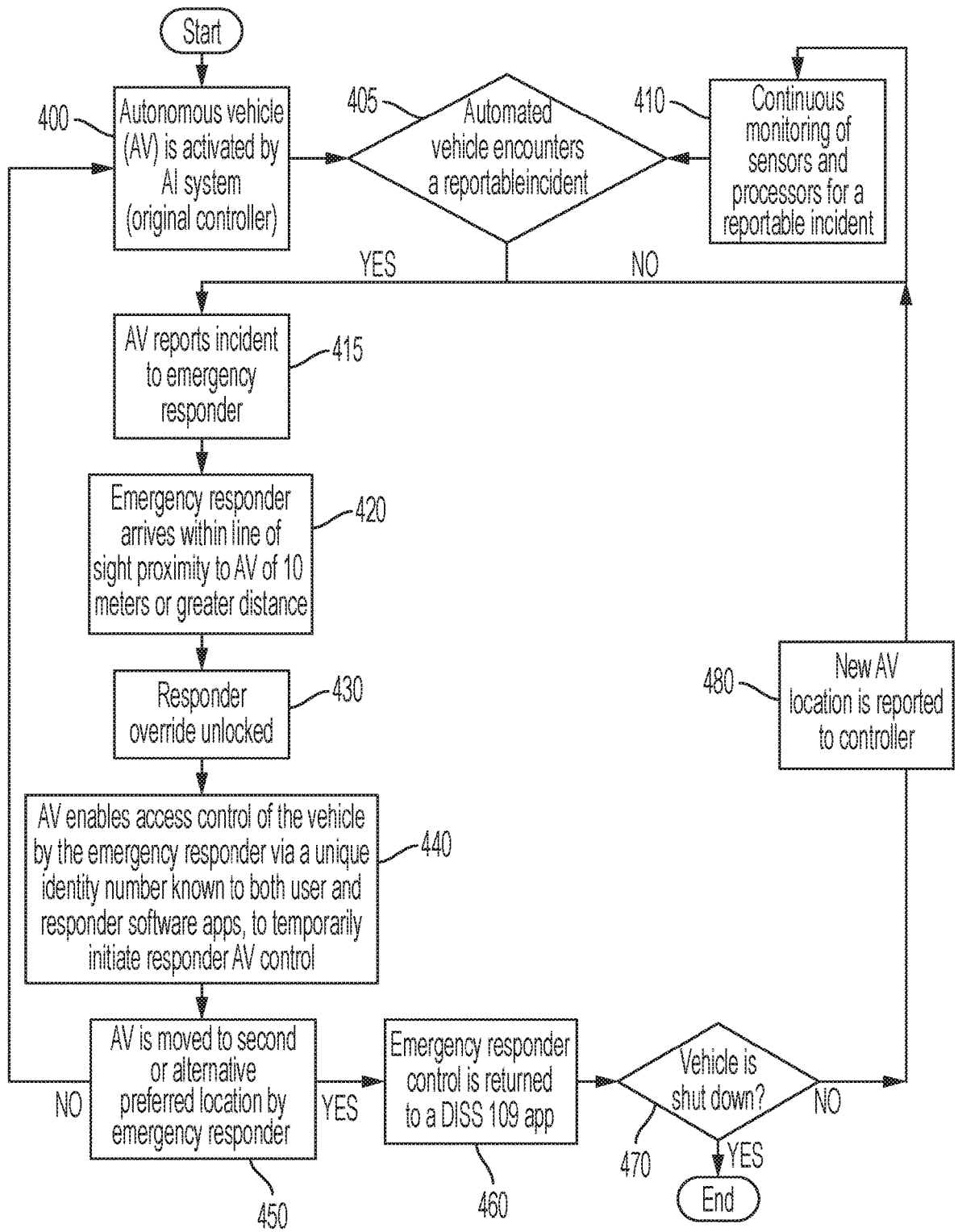
FIG. 4 is a flowchart illustrating an example of a system and method for handoff of control of an autonomous vehicle to an emergency responder or human driver in the event of an incident that can be implemented in the AI system of FIG. 1.

Referring to FIG. 4, a flowchart illustrating an example of a method for handoff of control of an autonomous vehicle to an emergency responder in the event of an accident or other emergency situation that can be implemented in the AI system of FIG. 1 is provided. The method can be applied, for example, when the AI system determines that an automated vehicle that has been in an incident cannot be safely moved after an accident or emergency situation.

At step 400, AI system 100 activates vehicle 103. At step 405, vehicle 103 encounters a reportable incident. The reportable incident could include a collision that is determined to be reportable as described with reference to FIGS. 2 and 3. The reportable incident also could include other emergency situations. At step 405, if a reportable incident is not detected, at step 410, AI system 100 continually monitors sensors for a reportable incident.

At step 415, if a reportable incident is determined, the reportable incident is reported to an emergency responder. The emergency responder could include the police, fire department, towing service, or other trusted emergency responder. At step 420, the emergency responder arrives within a line of sight in a 10 meter or greater proximity to the vehicle 103 using a mobile user device, such as user device 106a belonging to the emergency responder.

At step 440, AI system 100 enables the emergency responder to access control of the vehicle 103 using a unique identity number known to both the emergency responder user device 106a and autonomous vehicle user device 106 device the DISS 109 of vehicle 106 using techniques, including handshake techniques. The unique identity number can be stored in the DISS 109. The unique identity number for the vehicle 103 will be specific to vehicle 103. The unique identity number may be encrypted. The unique identity number for the emergency responder device 106a will be specific to an emergency responder and a trusted identity number. The user device 106 and DISS 109 will be programmed and configured to cede control of vehicle 103 automatically and without requiring a response from user device 106 when user device 106 receives the trusted unique identity number from emergency responder user device 106a identifying the emergency responder user device 106a as belonging to a trusted emergency responder.

To protect against unauthorized access of control of vehicle 103 by fraudulent emergency responders or hackers, the communication of the unique identity numbers using handshake techniques should preferably be made using encryption techniques and the unique emergency responder identity numbers should be identified and stored as trusted numbers in the DISS 109.

At step 450, the emergency responder sends the vehicle 103 to an alternative preferred location manually or using user device. At step 450 vehicle 106 is moved from a location where the incident occurred to a second location or an alternative preferred location in an automated or manual manner. The alternative preferred location can be chosen to ensure the vehicle 106 is safely out of the way of oncoming traffic.

At step 460, control of vehicle 106 can be returned to DISS 109 and at step 470, the vehicle 103 is shut down but can be restarted if vehicle 106 needs to be towed after an accident or other emergency has been taken care of.

Unlike prior art methods, this method of transfer of automated control of vehicle 106 does not require or rely upon receiving a response from the owner of the vehicle to transfer control or permit the owner to deny control to the emergency responder.

Figure 5:
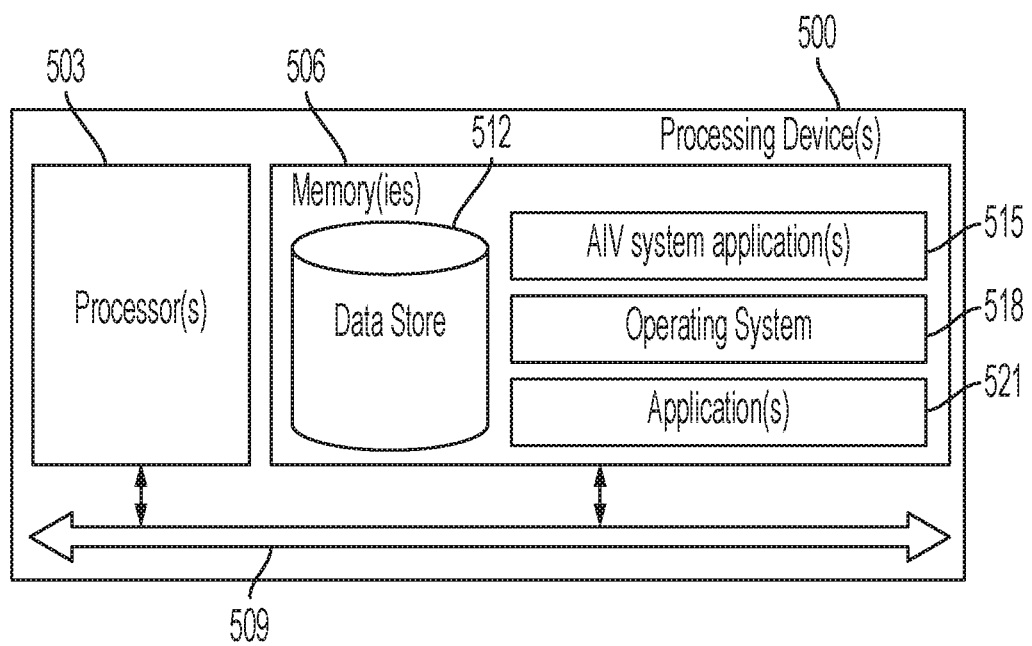
FIG. 5 is a schematic block diagram that provides one example illustration of a processing device employed in the AI system of FIG. 1 in accordance with various embodiments of the present disclosure.

With reference now to FIG. 5, shown is a schematic block diagram of a processing device 500 that may be used to implement various portions of the AI system 100 of FIG. 1 in accordance with various embodiments of the present disclosure. The processing device 500 may include, e.g., a computer and/or microprocessor included in a vehicle 103, the user devices 106 and 106a, and/or a server supporting the DISS 109 (FIG. 1). The processing device 500 includes at least one processor circuit, for example, having a processor 503 and a memory 506, both of which are coupled to a local interface 509. To this end, the processing device 500 may comprise processing circuitry such as, for example, at least one computer, tablet, smart phone, or like device. The local interface 509 may comprise, for example, a data bus with an accompanying address/control bus or other bus structure as can be appreciated. The processing device 1100 can include a display for rendering of generated graphics such as, e.g., a user interface and an input interface such, e.g., a keypad or touch screen to allow for user input. In addition, the processing device 1100 can include communication interfaces (not shown) that allow the processing device 1100 to communicatively couple with other devices such as, e.g., communication interfaces included in a vehicle 103, a user device 106, emergency responder user device 106a, and/or devices supporting the DISS 109. The communication interfaces may include one or more wireless connection(s) such as, e.g., Bluetooth or other radio frequency (RF) connection and/or one or more wired connection(s).

Stored in the memory 1106 are both data and several components that are executable by the processor 1103. In particular, stored in the memory 1106 and executable by the processor 1103 are AI system application(s) 1115, an operating system 1118, and/or other applications 1121. AI system applications can include applications that support, e.g., autonomous passenger retrieval, autonomous parking, intelligent collision avoidance, intelligent accident reporting, gradual intelligent route learning, remote cabin control, and/or distributed information sharing. It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, Matlab or other programming languages and their libraries.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the AI system application(s) 1115, the operating system 1118, application(s) 1121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, and 4 show the functionality and operation of an implementation of portions of the DISS 109 and AI system 100 application(s) 1115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the AI system application(s) 1115 and/or application(s) 1121, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

What is claimed is:

1. A distributed information system (DISS) comprising: at least one processing device, the DISS programmed and configured to:
   receive information from a plurality of distributed sensors in an autonomous vehicle;
   determine the existence of an incident based upon the information received from the plurality of distributed sensors;
   determine vehicles, passengers, and pedestrians, animals and objects involved in the incident and a nature of the injuries and damages to the vehicles, passengers, and pedestrians, animals and objects involved in the incident based on the information received from the sensors;
   determine if the autonomous vehicle can be safely moved autonomously from a location where the incident occurred to a second location;
   if the autonomous vehicle can safely be moved to the second location, autonomously move the vehicle to the second location and park the vehicle;
   wherein the DISS is programmed and configured further to: shut down the autonomous vehicle if the DISS determines that the autonomous vehicle cannot be moved safely from the location where the incident occurred to a second location.

2. The DISS of claim 1, wherein the DISS is programed and configured further to contact an emergency responder.

3. The DISS of claim 2, wherein the DISS is programed and configured further to provide the emergency responder with the number of vehicles, passengers, and pedestrians, animals and objects involved in the incident and the nature of the injuries and damages to the vehicles, passengers, and pedestrians, animals and objects involved in the incident.

4. The DISS of claim 2, wherein the DISS is programmed and configured further to determine when an emergency responder arrives at the automated vehicle based on information received from the plurality of distributed sensors.

5. The DISS of claim 3, wherein the DISS is programmed and configured further to receive a request to transfer control of the vehicle from an emergency responder user device; and in response to the request from the emergency responder user device, transfer control of the automated vehicle to the emergency responder without requiring approval from an owner of the vehicle or permitting the owner to prevent the transfer.

6. The DISS of claim 5, wherein the DISS is programmed and configured further to require the request from the emergency responder to contain a unique identification number and be communicated from the emergency responder user device using encryption techniques.

7. The DISS of claim 6, wherein the unique identification number of the emergency responder is stored in the DISS as trusted.

8. The DISS of claim 7, wherein the DISS is programmed and configured further to require the request from the emergency provider user device to be communicated using a handshake with the DISS.

9. The DISS of claim 8, wherein the DISS is programmed and configured further to communicate information related to the incident to an owner of the vehicle or other interested party.

10. A method for determining an incident involving an autonomous vehicle comprising:
    receiving information from a plurality of distributed sensors at a distributed information system (DISS) in electronic communication with an autonomous vehicle;
    determining the existence of an incident based upon the information received from the plurality of distributed sensors;
    determining vehicles, passengers, and pedestrians, animals and objects involved in the incident and a nature of injuries and damages to the vehicles, passengers, and pedestrians, animals and objects involved in the incident based on the information received from the sensors;
    determining if the autonomous vehicle can be safely moved autonomously from a location where the incident occurred to a second location;
    if the autonomous vehicle can safely be moved to the second location autonomously, move the vehicle to the second location and park the vehicle;
    shutting down the autonomous vehicle if the DISS determines that the autonomous vehicle cannot be moved safely from the location where the incident occurred to a second location.

11. The method of claim 10, further comprising the DISS contacting an emergency responder.

12. The method of claim 11, further comprising providing the emergency responder with the number of vehicles, passengers, and pedestrians, animals and objects involved in the incident and the nature of the injuries and damages to the vehicles, passengers, and pedestrians, animals and objects involved in the incident.

13. The method of claim 12, further comprising the DISS determining when an emergency responder arrives at the automated vehicle based on information received from the plurality of distributed sensors.

14. The method of claim 13, further comprising receiving a request from an emergency responder user device to transfer control of the vehicle to the emergency responder user device; and in response to the request from the emergency responder user device, transfer control of the automated vehicle to the emergency responder without requiring approval from an owner of the vehicle.

15. The method of claim 14, wherein the request from the emergency responder is required to contain a unique identification number and be communicated from the emergency responder user device to the DISS using encryption techniques.

16. The method of claim 15, wherein the unique identification number of the emergency responder is stored in the DISS as trusted.

17. The method of claim 16, wherein the request from the emergency provider user device is communicated using a handshake with the DISS.

18. The method of claim 17, wherein the DISS communicates information related to the incident to an owner of the vehicle or other interested party.

* * * * *